United States Patent
Niemela

(10) Patent No.: US 9,183,392 B2
(45) Date of Patent: Nov. 10, 2015

(54) ANTI-MALWARE TOOL FOR MOBILE APPARATUS

(71) Applicant: F-Secure Corporation, Helsinki (FI)

(72) Inventor: Jarno Niemela, Kirkkonummi (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/301,695

(22) Filed: Jun. 11, 2014

(65) Prior Publication Data

US 2014/0373153 A1 Dec. 18, 2014

(30) Foreign Application Priority Data

Jun. 17, 2013 (GB) .................................. 1310765.1

(51) Int. Cl.
*G06F 21/00* (2013.01)
*G06F 21/56* (2013.01)
*G06F 21/55* (2013.01)

(52) U.S. Cl.
CPC ............ *G06F 21/566* (2013.01); *G06F 21/554* (2013.01); *G06F 2221/031* (2013.01)

(58) Field of Classification Search
CPC G06F 21/566; G06F 21/554; G06F 2221/031
See application file for complete search history.

(56) References Cited

U.S. PATENT DOCUMENTS

| 2009/0006402 | A1* | 1/2009 | Bohle et al. ........................ 707/8 |
| 2013/0067576 | A1 | 3/2013 | Niemela ........................... 726/24 |
| 2014/0181971 | A1* | 6/2014 | Tatarinov et al. ............... 726/23 |
| 2014/0325650 | A1* | 10/2014 | Pavlyushchik .................. 726/23 |

FOREIGN PATENT DOCUMENTS

CN 102279912 A 12/2011

OTHER PUBLICATIONS

Anand Ajjan, Ransomware: Next-Genratation Fake Antirvirus, Feb. 2013, Sophos, pp. 5-7, 16-22.*

* cited by examiner

*Primary Examiner* — Jeffrey Pwu
*Assistant Examiner* — William Corum, Jr.
(74) *Attorney, Agent, or Firm* — Harrington & Smith

(57) ABSTRACT

A method, apparatus, and computer program for monitoring security of a mobile apparatus are disclosed. The method includes executing a security application in a mobile apparatus; monitoring, by the security application, user interface locking status of the mobile apparatus; determining, as a result of said monitoring, that the user interface has been locked; identifying an application that has caused said locking of the user interface; checking a reputation status of the identified application; upon detecting, as a result of said reputation status check, that the identified application has a bad reputation status, restricting operation of the identified application and unlocking the user interface.

21 Claims, 3 Drawing Sheets

ANTI-MALWARE TOOL FOR MOBILE APPARATUS

FIELD

The invention relates to the field of computer security and, particularly, protecting a mobile device against malicious attacks.

BACKGROUND

Computer viruses and malicious software (called malware) have existed for decades in a desktop computing environment. With the rapid growth of mobile computing devices such as mobile phones and tablet computers, virus and malware creators have started designing viruses and malware attacking mobile platforms.

BRIEF DESCRIPTION

According to an aspect of the invention, there is provided a method comprising: executing a security application in a mobile apparatus; monitoring, by the security application, user interface locking status of the mobile apparatus; determining, as a result of said monitoring, that the user interface has been locked; identifying an application that has caused said locking of the user interface; checking a reputation status of the identified application; upon detecting, as a result of said reputation status check, that the identified application has a bad reputation status, restricting operation of the identified application and unlocking the user interface.

According to another aspect, there is provided an apparatus comprising at least one processor and at least one memory including a computer program code. The at least one memory and the computer program code are configured, with the at least one processor, to cause the apparatus to: execute a security application in the apparatus; monitor, in the security application, user interface locking status of the apparatus; determine, as a result of said monitoring, that the user interface has been locked; identify an application that has caused said locking of the user interface; check a reputation status of the identified application; upon detecting, as a result of said reputation status check, that the identified application has a bad reputation status, restrict operation of the identified application and unlock the user interface.

According to another aspect, there is provided a computer program product embodied on a non-transitory distribution medium readable by a computer and comprising program instructions which, when loaded into a computer, execute a computer process comprising: executing a security application in a mobile apparatus; monitoring, by the security application, user interface locking status of the mobile apparatus; determining, as a result of said monitoring, that the user interface has been locked; identifying an application that has caused said locking of the user interface; checking a reputation status of the identified application; upon detecting, as a result of said reputation status check, that the identified application has a bad reputation status, restricting operation of the identified application and unlocking the user interface.

Embodiments of the invention are defined in the dependent claims.

LIST OF DRAWINGS

Figure 1:
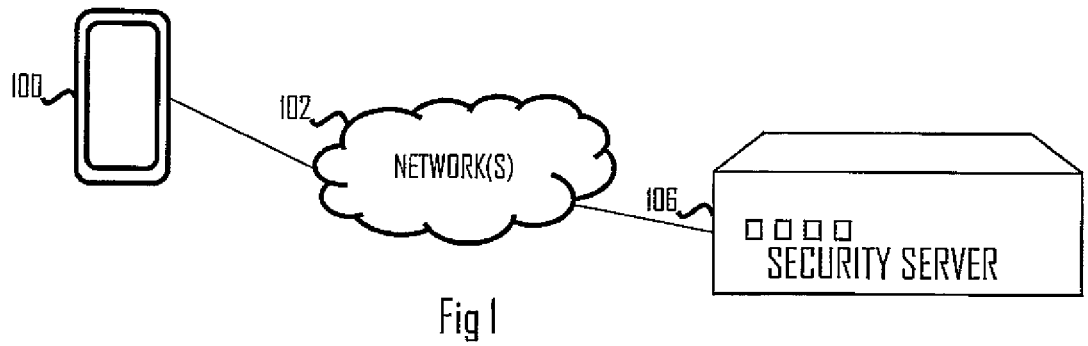
Figure 2:
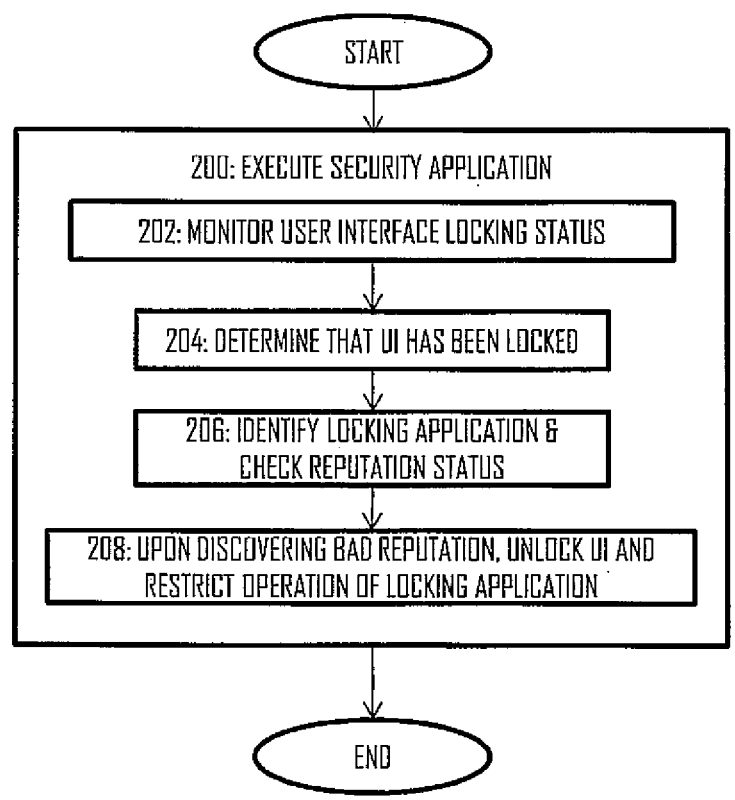
Figure 3:
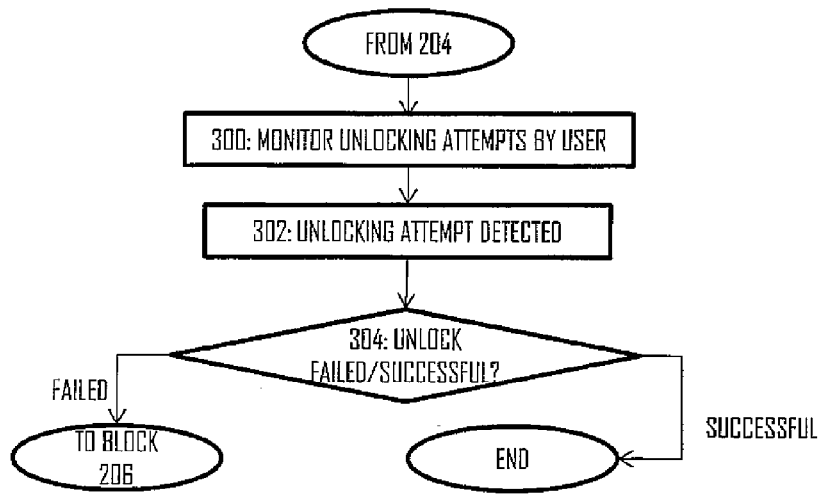
Figure 4:
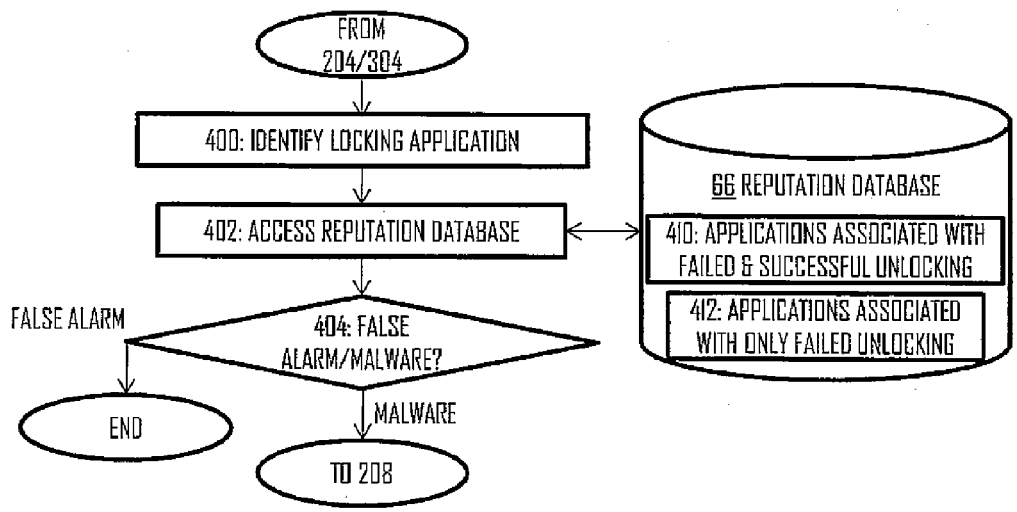
Figure 5:
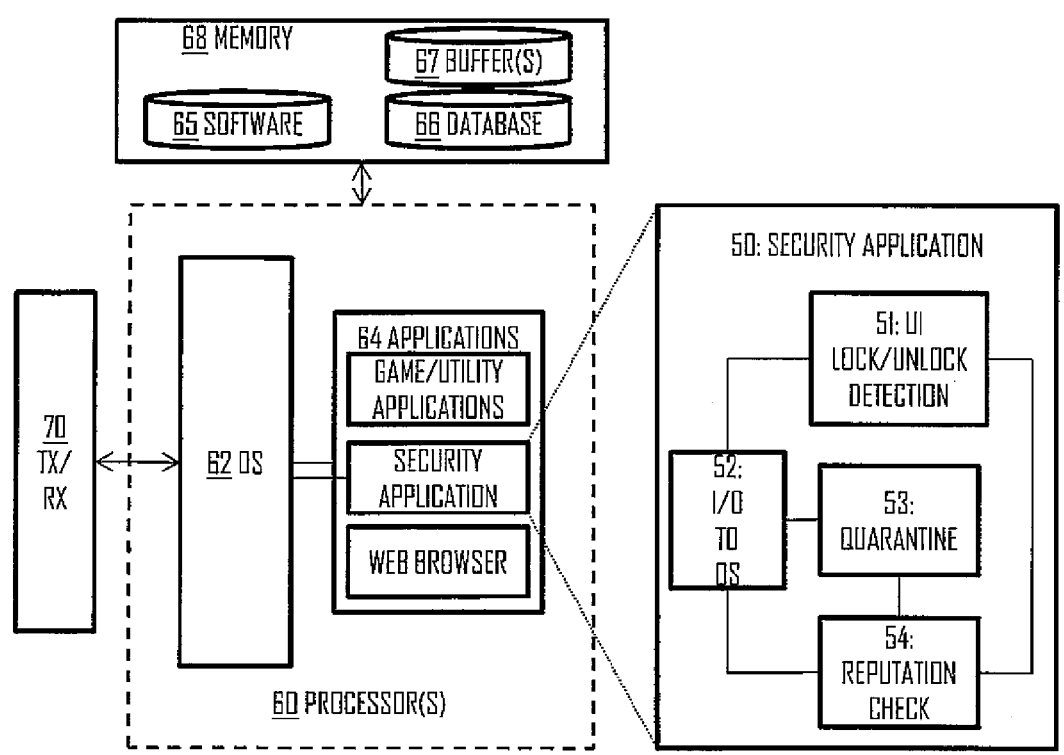

Embodiments of the present invention are described below, by way of example only, with reference to the accompanying drawings, in which FIG. 1 illustrates a mobile environment to which embodiments of the invention may be applied;

FIGS. 2 to 4 illustrates embodiments of a process for protecting a mobile apparatus against applications locking the use of the mobile apparatus; and FIG. 5 is a block diagram illustrating a structure of an apparatus according to an embodiment of the invention.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

FIG. 1 illustrates a scenario to which embodiments of the invention may be applied. Modern mobile apparatuses such as mobile phones and tablet computers execute various applications and new applications are quite easy to install. A mobile apparatus may be defined as being portable and operating a mobile operating system (OS). A mobile OS combines features of a personal computer (PC) with features such as a touch screen, cellular communications, Bluetooth communications, satellite navigation, camera, video camera, speech music player, near-field communications (NFC) based on radio frequency identification (RFID) technology, etc. Mobile operating systems comprise Android® by Google Inc.®, Blackberry 10, iOS by Apple Inc.®, Nokia Asha platform, Windows Phone by Microsoft®, Sailfish OS by Jolla, and Symbian OS.

Such mobile apparatuses are a potential target for malicious software (malware) attacks. Malware comprises various applications that have different functions. Some malware delete data for the functionality of the mobile apparatus while other malware lock the user interface. Ransomware is an example of the latter. Ransomware typically locks the user interface and informs the user that the user interface will be opened when the user pays a ransom. In a mobile apparatus, the ransomware may employ a user interface lock function provided by an operating system of the mobile apparatus. In other examples, the ransomware display a determined screen and blocks the use of any user input. The mobile OSs typically provide the user with less freedom with respect to making system configurations than PC OSs. With respect to removal of malware, some malware preventing the use of a PC may be removed manually through a safe mode even if a security application is not able to remove the malware. In mobile platforms, such a procedure is not possible. Therefore, an effective security application executed in a mobile OS is crucial.

Computer security software are designed for mobile apparatuses as well. Referring to FIG. 1, a security application may be installed to a mobile apparatus 100. The security application may communicate with a security server 106 by using communication circuitries of the mobile apparatus 100. The connection between the security server 106 and the mobile apparatus may be established through one or more computer networks 102 comprising wired and/or wireless networks. The security application may access the security server 106 and retrieve latest definitions for malware, to make reputation checks with respect to suspicious applications detected to be running in the mobile apparatus, etc. The security server 106 may store up-to-date definitions and statistics for known malware, and each known malware may be associated in the security server 106 with a bad reputation status. The security application may thus use the security server 106 as a database to cross-check a reputation status of a suspicious application detected in the mobile apparatus 102. In some embodiments, the up-to-date database is transferred to the mobile apparatus 100 in connection with a definitions update process.

FIG. 2 illustrates a process for providing computer security in the mobile apparatus 100. The process of FIG. 2 may be executed as a computer process by at least one processor comprised in the mobile apparatus. Referring to FIG. 2, a security application is executed in the mobile apparatus in block 200. The security application is configured to carry out blocks 202 to 208 and, thus, detect harmful applications that take control of the user interface of the mobile apparatus. In block 202, the security application monitors a user interface locking status of the mobile apparatus. In block 204, the security application determines, as a result of said monitoring, that the user interface has been locked. In block 206, the security application identifies an application that has caused said locking of the user interface and checks a reputation status of the identified application. Upon detecting, as a result of said reputation status check, that the identified application has a bad reputation status, the security application restricts operation of the identified application and unlocks the user interface (block 208). The restriction may comprise terminating a process of the identified application and/or uninstalling the application. Block 208 may further comprise indicating the detection and removal of the threat caused by the potentially harmful application.

This procedure may be used to detect and remove malware such as ransomware that typically locks the user interface and does not allow the mobile apparatus to respond to user inputs.

The locking status of the user interface may be monitored by monitoring events in computer programs executed in the mobile apparatus. The security application may monitor application programming interfaces (API) of the mobile apparatus or a computer program code executed in the mobile apparatus in order to detect the locking status. For example, in Windows Phone OS the security application may search for the presence of PhoneApplicationFrame.Obscured event. Presence of this event indicates that a user interface is being covered which may be used as an indication that the user interface is locked. In Android OS, the security application may monitor for a combination of a presence of an event Intent.ACTION_SCREEN_ON and a missing event Intent.ACTION_USER_PRESENT. The former event indicates that the screen is turned on while the latter event indicates that the user is not using the mobile apparatus. This combination may indicate that an application has taken over the user interface and locked it. An example of monitoring the API is monitoring a value of Keyguard API of Android by using a function isKeyguardLocked( ). Another embodiment monitors the activation of a screensaver, wherein the activation of the screensaver may be determined as the user interface being locked. Alternatively, the user interface may be detected to be locked when a user input does not deactivate the screen saver. Other explicit or implicit solutions for detecting the locking status may be used in various mobile operating systems. At least some of the above-described embodiments may detect the locking caused by using a user interface locking function of the OS and locking caused by an application by locking a display to display a screen of the (malware) application.

FIG. 3 illustrates an embodiment of the process of FIG. 2. The user interface is often locked for non-harmful purposes, e.g. to avoid unintentional user inputs when the mobile apparatus is in a pocket or bag. The embodiment of FIG. 3 provides an improvement in that the security application triggers the block 206 only after a determined number of failed unlocking attempts have been detected. The process of FIG. 3 may be executed between blocks 204 and 206. Referring to FIG. 3, upon detecting that the user interface has been locked, the security application may start monitoring unlocking attempts by a used (block 300). The unlocking attempt may be detected by monitoring events that relate to user inputs through the user interface, e.g. through a touch-sensitive display or at least one button or key. Upon detecting an unlocking attempt in block 302, the security application may determine whether the unlocking attempt was a success or a failure, i.e. whether or not the user interface was unlocked. The success of the unlocking may be detected by monitoring the above-described events in the computer program code or the API. Some operating systems (e.g. Symbian OS) may provide a dedicated event indicating that the user interface was unlocked. In some embodiments, the unlocking event may be detected by detecting that the display screen is switched on and the operating system is running routines that belong to conventional operation in an unlocked state. Detection of no such routines after the detection of the locked state and subsequent user inputs may be determined as a failed unlocking attempt. Upon determining that the unlocking was failed, the process may proceed to block 206. Otherwise, the process may end and the security application may determine that the mobile apparatus operates in an intended manner.

In an embodiment of FIG. 3, the process proceeds to block 206 only after a determined number of failed unlocking attempts have been detected. After detecting a failed unlocking attempt in block 304, the security application may increment a counter counting the number of failed unlocking attempts. If a current value of the counter is below the determined number of failed unlocking attempts, the process may return to block 300. Otherwise, the process may proceed to block 206. The determined number of failed unlocking attempts may thus be higher than one.

In another embodiment, the security application measures the duration for how long the user interface has been locked. Upon expiry of a determined duration, the security application may launch block 206.

FIG. 4 illustrates an embodiment of block 206. Referring to FIG. 4, the security application identifies the application that has locked the user interface in block 400. The application may be identified by reading a computer program code and detecting an application that has originated a system call to lock the user interface. In another embodiment, the application may be detected by monitoring an API related to the user interface locking. The application using the API to lock the user interface is identified when it uses the API to lock the user interface. In yet another embodiment using also the embodiment of FIG. 3, the security application may identify the locking application by cross-referencing a database for applications that are common to mobile apparatuses experiencing problems with unlocking a locked user interface. The database may be stored in the mobile apparatus 100 or in the security server 106. The security application may compare application installed to the mobile apparatus 100 with applications identified in the database as being associated with unlocking problems. If a match is found, i.e. an application installed to the mobile apparatus 100 is found in the database, the security application may identify the matching application as the one that has locked the user interface.

In block 402, the security application accesses a reputation database 66 in order to determine whether the identified locking application is known to have a bad, good, or unknown reputation. As described above, the reputation database 66 may be stored in the security server 106 or in a memory of the mobile apparatus 100. The reputation database may comprise a first record 410 comprising applications associated with successful unlocking feature and a second record 412 comprising application associated with failed unlocking feature. At least some of the applications comprised in the first record 410 may be associated with both failed and successful unlocking feature. Accordingly, the reputation database 66 may store in its records identifiers of those applications that are known to have constant problems with unlocking and these identifiers may be stored in the second record 412 and marked as having a bad reputation (blacklist). The reputation database 66 may also store in its records identifiers of those applications that are known to have problems with unlocking but that are also known to be unlocked successfully and/or identifiers of those applications that are known to be unlocked successfully. These identifiers may be stored in the first record 410 and marked as having a good reputation (whitelist). The reputation database may store only one of the first record and second record in some embodiments. For example, if the reputation database 66 stores only the second record 412 and if the security application does not find the identified application in the second record, the identified application may be determined to have a good reputation.

The above-described reputation check may be used to avoid false alarms caused by the user forgetting a correct password to unlock the locking state. For example, if the security application detects failed unlocking attempt(s) and carries out blocks 400 and 402, the security application acquires in the reputation check relevant information on whether the failed unlocking attempt was caused by a suspicious application or a probable user error. If the reputation check shows that the application has a bad reputation, the security application may determine the application as a potential malware in block 404 and proceed to block 208. If the reputation check shows that the application has a good reputation, the security application may determine that the failed unlocking attempt was a user error and end the process. As a consequence, a false alarm will not cause restriction or even uninstall of an application that is not malware.

Thresholds used in categorizing the applications to the first record and second record 410 and 412 may be selected according to a design. It may be advantageous to insert an application to the second record 412 if the application is associated with statistics that indicate that a significant majority of unlocking attempts have failed, e.g. over 99%. Otherwise, the application may be inserted into the first record 410. In connection with each unlocking attempt, the security application may increment a counter counting successful and failed unlocking attempts with respect to each application that is detected to lock the user interface. The security application may then transfer thus gathered statistics to the reputation database 66 stored in the security server 106 so that other security applications may use improved statistics and that the security server 106 may reliably determine applications having a bad reputation.

FIG. 5 illustrates a block diagram of an embodiment of an apparatus for carrying out the embodiments described above. The apparatus may be comprised in the mobile apparatus 100, and the apparatus may comprise a processing system configured or arranged to carry out computer security functions. The processing system may comprise at least one processor 60 and at least one memory 68 including a computer program code 65, wherein the at least one memory 68 and the computer program code 65 are configured, with the at least one processor 60, to cause the apparatus to carry out the above-described embodiments of the security application.

The processing system may refer to any one of the following: (a) a hardware-only circuit implementation such as an implementation in only analogue and/or digital circuitry; (b) a combination of hardware circuitry and software and/or firmware, such as (as applicable): (i) a combination of processor(s) or processor cores; or (ii) portions of processor(s)/software including digital signal processor(s), software, and at least one memory that work together to cause the apparatus to perform specific functions; and (c) circuits, such as a microprocessor(s) or a portion of a microprocessor(s), that require software or firmware for operation, even if the software or firmware is not physically present. The processing system may also cover an implementation of merely a processor (or multiple processors) or portion of a processor, e.g. one or multiple cores of a multi-core processor, and its (or their) accompanying software and/or firmware. The term processing system would also cover, for example, an integrated circuit, an application-specific integrated circuit (ASIC), and/or a field-programmable grid array (FPGA) circuit for the apparatus according to an embodiment of the invention.

Referring to FIG. 5, the processor 60 may be configured to execute an operating system (OS) 62 of the personal computing device 100. The operating system may be any one of the above-describe mobile operating systems but it may be another OS designed for mobile apparatuses. As known in the art, the operating system 62 manages hardware resources, e.g. the processor(s) 60 and provides services to applications 64 executed in the personal computing device 100. The services may be provided through one or more APIs that serve as an interface between the applications 64 and the operating system 62. The applications 64 may comprise any known computer program applications including the security application, game and/or utility applications, office applications, professional applications related to any professional field, a web browser, etc. The apparatus may further comprise or be connected to a communication interface 70 comprising hardware and/or software for realizing a communication connectivity according to one or more communication protocols. The communication interface 70 may comprise components providing the mobile apparatus 100 with wireless communication capability, e.g. the communication interface 70 may comprise radio interface components providing radio communication capability. The operating system 62 may configure the communication interface 70 to provide a connection to the computer networks 102, e.g. the Internet. The communication interface 70 under the control of the operating system 62 may be used to access the security server 106.

The security application 50 may comprise an anti-virus engine, a firewall, a network traffic monitor, etc. for tracking any known attack vector to prevent a virus, worm, or malware from accessing the apparatus. The security application 50 may also provide the above-described functionality for protecting the apparatus against applications that lock the user interface and prevent unlocking it. Referring to FIG. 5, the security application 50 may comprise an interface 52 to the operating system 62. The interface 52 may be a software interface, and it may be used to monitor instructions executed by the operating system 62, APIs, etc. The interface 52 may further be used to access the reputation database 66 in order to carry out the above-described reputation checks. The security application 50 may comprise a user interface locking/unlocking detection module 51 configured to monitor the locking status of the user interface and unlocking attempts in the above-described manner. Upon detecting that the user interface has been locked and/or that the user has failed in unlocking the user interface, the user interface locking/unlocking detection module 51 may call a reputation check module 54 to identify the application that has locked the user interface and to carry out a reputation check for the identified application in the above-described manner. Upon discovering that the application that has locked the user interface has a bad reputation, the reputation check module 54 may call a quarantine module 53 configured to unlock the user interface and to restrict the operation of the identified application. The quarantine module may prevent further actions by the application, quarantine the application or delete the application. The security application may further output a notification through a display unit of the apparatus that a potentially harmful application has been detected and removed.

The apparatus may further comprise the user interface comprising a display unit, an input device, etc. The user interface may comprise a touch-sensitive display, one or more hard buttons, etc.

The processes or methods described in FIGS. 2 to 4 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to mobile apparatuses defined above but also to other suitable mobile ecosystems. The specifications of the mobile systems develop rapidly and such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   executing a security application in a mobile apparatus;
   monitoring, by the security application, user interface locking status of the mobile apparatus by monitoring a dedicated locking function of a mobile operating system executed in the mobile apparatus;
   determining, as a result of said monitoring, that the locking function of the mobile operating system has locked the user interface;
   identifying an application that has made a system call to the locking function of the mobile operating system to cause said locking of the user interface;
   checking a reputation status of the identified application;
   upon detecting, as a result of said reputation status check, that the identified application has a bad reputation status in terms of unsuccessful unlocking of the locked user interface, restricting operation of the identified application and unlocking the user interface.

2. The method of claim 1, said monitoring comprising:
   monitoring the user interface locking status by monitoring an application programming interface of the locking function of the mobile operating system, and said identifying the application comprising identifying the application when the application when the application uses the application programming interface to call the locking function to lock the user interface.

3. The method of claim 1, said monitoring comprising:
   monitoring the user interface locking status by reading a computer program code, and said identifying the application comprising detecting, from the computer program code, the application that has originated the system call to the locking function.

4. The method of claim 1, further comprising: distinguishing false alarms from malicious software infections in the reputation check, wherein said distinguishing is based on user experience related to users of other mobile apparatuses in such manner that if at least a determined number higher than one user has successfully unlocked user interface locking caused by the identified application, a false alarm is determined and, otherwise, a malicious software infection is determined, and wherein statistics of said user experience are maintained in a reputation database.

5. The method of claim 1, said restriction of the operation of the identified application comprising terminating the operation of the identified application.

6. The method of claim 1, said monitoring the user interface locking status comprising monitoring a state of a function of an operating system executed in the mobile apparatus, said function indicating the user interface locking status.

7. The method of claim 1, said monitoring the user interface locking status comprising monitoring a status of a display unit of the mobile apparatus and, if the display unit is shut down, determining that the mobile apparatus is locked.

8. The method of claim 1, said identifying the application comprising determining an application that has launched a function call to lock the user interface by checking executed computer program code.

9. The method of claim 1, said identifying the application comprising determining an application that has launched a function call to lock the user interface by checking an application programming interface.

10. The method of claim 1, said identifying the application comprising:
    cross-referencing, from a database, applications that are common to mobile apparatuses experiencing problems with unlocking a locked user interface; and
    identifying the application on the basis of said cross-referencing.

11. An apparatus comprising:
    at least one processor;
    at least one memory including a computer program code, wherein the at least one memory and the computer program bode are configured, with the at least one processor, to cause the apparatus to:
    execute a security application in the apparatus;
    monitor, in the security application, user interface locking status of the apparatus by monitoring a dedicated locking function of a mobile operating system executed in the apparatus;
    determine, as a result of said monitoring, that the locking function of the mobile operating system has locked the user interface;
    identify an application that has made a system call to the locking function of the mobile operating system to cause said locking of the user interface;
    check a reputation status of the identified application;
    upon detecting, as a result of said reputation status check, that the identified application has a bad reputation status in terms of unsuccessful unlocking of the locked user interface, restrict operation of the identified application and unlock the user interface.

12. The apparatus of claim 11, wherein the at least one memory and the computer program code are configured, with the at least one processor, to cause the apparatus to monitor the user interface locking status by monitoring an application programming interface of the locking function of the mobile operating system, and said identifying the application comprising identifying the application when the application when the application uses the application programming interface to call the locking function to lock the user interface.

13. The apparatus of claim 11, wherein the at least one memory and the computer program code are configured, with the at least one processor, to cause the apparatus to monitor the user interface locking status by reading a computer program code, and said identifying the application comprising detecting, from the computer program code, the application that has originated the system call to the locking function.

14. The apparatus of claim 11, wherein the at least one memory and the computer program code are configured, with the at least one processor, to cause the apparatus to distinguish false alarms from malicious software infections in the reputation check, wherein said distinguishing is based on user experience related to users of other mobile apparatuses in such manner that if at least a determined number higher than one user has successfully unlocked user interface locking caused by the identified application, a false alarm is determined and, otherwise, a malicious software infection is determined, and wherein statistics of said user experience are maintained in a reputation database.

15. The apparatus of claim 11, wherein the at least one memory and the computer program code are configured, with the at least one processor, to cause the apparatus to carry out said restriction of the operation of the identified application by at least terminating the operation of the identified application.

16. The apparatus of claim 11, wherein the at least one memory and the computer program code are configured, with the at least one processor, to cause the apparatus to carry out said monitoring the user interface locking status by at least monitoring a state of a function of an operating system executed in the apparatus, said function indicating the user interface locking status.

17. The apparatus of claim 11, wherein the at least one memory and the computer program code are configured, with the at least one processor, to cause the apparatus to carry out said monitoring the user interface locking status by at least monitoring a status of a display unit of the apparatus and, if the display unit is shut down, determining that the apparatus is locked.

18. The apparatus of claim 11, wherein the at least one memory and the computer program code are configured, with the at least one processor, to cause the apparatus to carry out said identifying the application by at least determining an application that has launched a function call to lock the user interface by checking executed computer program code.

19. The apparatus of claim 11, wherein the at least one memory and the computer program code are configured, with the at least one processor, to cause the apparatus to carry out said identifying the application by at least determining an application that has launched a function call to lock the user interface by checking an application programming interface.

20. The apparatus of claim 11, wherein the at least one memory and the computer program code are configured, with the at least one processor, to cause the apparatus to carry out said identifying the application by performing at least the following:
cross-reference, from a database, applications that are common to mobile apparatuses experiencing problems with unlocking a locked user interface; and
identify the application on the basis of said cross-referencing.

21. A computer program product embodied on a non-transitory distribution medium readable by a computer and comprising program instructions which, when loaded into a computer, execute a computer process comprising:
executing a security application in a mobile apparatus;
monitoring, by the security application, user interface locking status of the mobile apparatus by monitoring a dedicated locking function of a mobile operating system executed in the mobile apparatus;
determining, as a result of said monitoring, that the locking function of the mobile operating system has locked the user interface;
identifying an application that has made a system call to the locking function of the mobile operating system to cause said locking of the user interface;
checking a reputation status of the identified application;
upon detecting, as a result of said reputation status check, that the identified application has a bad reputation status in terms of unsuccessful unlocking of the locked user interface, restricting operation of the identified application and unlocking the user interface.

* * * * *